(12) United States Patent
Glover

(10) Patent No.: US 8,109,357 B1
(45) Date of Patent: Feb. 7, 2012

(54) METHOD AND APPARATUS FOR LIQUID DRIVEN TURBINE ENGINE FOR VEHICLES

(76) Inventor: Richard P. Glover, Dothan, AL (US)

( * ) Notice: Subject to any disclaimer, the term of this patent is extended or adjusted under 35 U.S.C. 154(b) by 512 days.

(21) Appl. No.: 12/380,967

(22) Filed: Mar. 6, 2009

(51) Int. Cl.
*B60K 17/00* (2006.01)

(52) U.S. Cl. .......................................... 180/305; 60/325

(58) Field of Classification Search .................. 180/242, 180/301, 305, 306, 307, 367; 60/325, 484; 414/202
See application file for complete search history.

(56) References Cited

U.S. PATENT DOCUMENTS

| | | | |
|---|---|---|---|
| 2,208,735 A * | 7/1940 | Simons ............................ | 72/279 |
| 2,279,008 A * | 4/1942 | Nathan ............................ | 60/328 |
| 2,468,828 A * | 5/1949 | Kopp ............................ | 180/305 |
| 3,023,579 A | 3/1962 | Bookaut et al. | |
| 3,076,316 A * | 2/1963 | Schlichtig ........................ | 60/643 |
| 3,256,950 A | 6/1966 | De Biasi | |
| 3,379,008 A * | 4/1968 | Manganaro .................... | 180/302 |
| 3,828,555 A * | 8/1974 | Capdevielle .................... | 60/413 |
| 3,828,880 A * | 8/1974 | Smith ............................ | 180/306 |
| 3,903,696 A * | 9/1975 | Carman .......................... | 60/414 |
| 3,948,047 A * | 4/1976 | Gilbert .......................... | 60/325 |
| 4,007,591 A * | 2/1977 | Hinchman et al. .............. | 60/325 |
| 4,043,126 A * | 8/1977 | Santos ............................ | 60/407 |
| 4,086,764 A * | 5/1978 | Brown et al. ................... | 60/325 |
| 4,414,809 A | 11/1983 | Burris | |
| 4,428,198 A * | 1/1984 | Sutter ............................ | 60/595 |
| 4,463,555 A * | 8/1984 | Wilcoxson ...................... | 60/325 |
| 4,753,070 A * | 6/1988 | Werner .......................... | 60/325 |
| 4,769,987 A * | 9/1988 | Arold ............................. | 60/325 |
| 4,935,650 A * | 6/1990 | Hannan, III ..................... | 310/11 |
| 4,966,708 A * | 10/1990 | Oklejas et al. ................. | 210/637 |
| 5,182,913 A * | 2/1993 | Robar et al. .................... | 60/671 |
| 5,230,402 A | 7/1993 | Clark et al. | |
| 5,271,225 A * | 12/1993 | Adamides ....................... | 60/416 |
| 5,398,505 A | 3/1995 | Oogushi et al. | |
| 5,727,388 A * | 3/1998 | Adamides ....................... | 60/417 |
| 5,847,470 A | 12/1998 | Mitchell | |
| 5,881,630 A | 3/1999 | Buschur et al. | |
| 5,960,628 A | 10/1999 | Machesney et al. | |
| 6,005,358 A | 12/1999 | Radev | |
| 6,311,487 B1 * | 11/2001 | Ferch ............................. | 60/413 |
| 6,349,787 B1 * | 2/2002 | Dakhil .......................... | 180/302 |
| 6,966,394 B2 * | 11/2005 | Fleming ........................ | 180/165 |
| 7,024,964 B2 * | 4/2006 | Fukuchi ........................ | 74/730.1 |
| 7,111,704 B2 | 9/2006 | Johnson | |
| 7,357,101 B2 * | 4/2008 | Boyarski ....................... | 123/1 A |
| 7,387,182 B2 * | 6/2008 | Fleming ........................ | 180/165 |
| 7,574,988 B1 * | 8/2009 | Fiorenza et al. ......... | 123/179.31 |
| 7,810,322 B2 * | 10/2010 | Rez ............................... | 60/348 |
| 2004/0238248 A1 * | 12/2004 | Fleming ........................ | 180/165 |
| 2006/0137927 A1 * | 6/2006 | Fleming ........................ | 180/165 |
| 2007/0227801 A1 | 10/2007 | Loeffler | |
| 2010/0018194 A1 * | 1/2010 | Kovach et al. ................. | 60/327 |

* cited by examiner

*Primary Examiner* — J. Allen Shriver, II
*Assistant Examiner* — Brodie Follman
(74) *Attorney, Agent, or Firm* — George L. Williamson

(57) ABSTRACT

Method and apparatus for a propulsion system for a vehicle or the like having a two part turbine system comprising a main turbine portion for driving the vehicle drive train and a smaller, accessory turbine system to provide auxiliary power for other components of the engine and vehicle. The turbines are both liquid driven by having a two-stage pressure system wherein the first stage raises the pressure to approximately 50 psi and the second stage system raises the pressure to approximately 3,000 to 5500 psi which pressurized fluid is then sprayed or injected onto the blades of a turbine so as to make the turbines rotate about a central drive axle. The fluid chosen as the hydraulic fluid of the present invention is extended life antifreeze.

14 Claims, 4 Drawing Sheets

METHOD AND APPARATUS FOR LIQUID DRIVEN TURBINE ENGINE FOR VEHICLES

BACKGROUND OF THE INVENTION

1. Field of the Invention

The present invention relates generally to propulsion systems for vehicles and, more particularly, is concerned with a fluid drive system for a vehicle or the like.

2. Description of the Prior Art

Fluid drive systems have been described in the prior art, however, none of the prior art devices disclose the unique features of the present invention.

In U.S. Pat. No. 5,881,630 dated Mar. 16, 1999, Buschur, et al., disclosed an apparatus and method of controlling fluid flow between a plurality of vehicle components. In U.S. Pat. No. 5,847,470 dated Dec. 8, 1998, Mitchell disclosed an auxiliary motor drive system. In U.S. Pat. No. 4,414,809 dated Nov. 15, 1983, Burris disclosed a hydraulic power steering and cooling fan drive system for vehicles. In U.S. Pat. No. 3,256,950 dated Jun. 21, 1966, de Biasi disclosed a hydraulic propulsion system. In U.S. Pat. No. 3,023,579 dated Mar. 6, 1962, Bookout, et al., disclosed a fluid pressure system. In U.S. Pat. No. 5,230,402 dated Jul. 27, 1993, Clark, et al., disclosed an electric hydraulic car. In U.S. Pat. No. 5,398,505 dated Mar. 21, 1995, Oogushi, et al., disclosed a fluid pressure driving system. In U.S. Patent Application Publication 2007/0227801 dated Oct. 4, 2007, Loeffler disclosed a hydraulic energy recovery system with dual powered auxiliary hydraulics. In U.S. Pat. No. 7,111,704 dated Sep. 26, 2006, Johnson disclosed a hydrostatic drive apparatus for a road vehicle. In U.S. Pat. No. 6,005,358 dated Dec. 21, 1999, Radev disclosed a drive system for electric vehicles. In U.S. Pat. No. 5,960,628 dated Oct. 5, 1999, Machesney, et al., disclosed a hydraulically powered fan and power steering in vehicle.

While these fluid driven systems may be suitable for the purposes for which they were designed, they would not be as suitable for the purposes of the present invention as hereinafter described.

SUMMARY OF THE PRESENT INVENTION

The present invention discloses a method and apparatus for a propulsion system for a vehicle or the like having a two part turbine system comprising a main turbine portion for driving the vehicle drive train and a smaller, accessory turbine system to provide auxiliary power for other components of the engine. The turbines are both liquid driven by having a two-stage pressure system wherein the first stage raises the pressure to approximately 50 psi and the second stage system raises the pressure to approximately 3,000 to 5500 psi which pressurized fluid is then sprayed or injected onto the blades of a turbine so as to make the turbines rotate about a central drive axle. The fluid chosen as the hydraulic fluid of the present invention is extended life antifreeze.

An object of the present invention is to provide an engine for a vehicle wherein the engine can be operated without the use of petroleum based gasoline or oil products. A further object of the present invention is to provide a motorized vehicle which can be operated more economically than vehicles powered by gasoline or petroleum based products. A further object of the present invention is to provide a motorized vehicle which can be easily and relatively cheaply manufactured. A further object of the present invention is to provide a motorized vehicle which can utilize commonly available and existing components to be used in the construction of the engine of the present invention.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
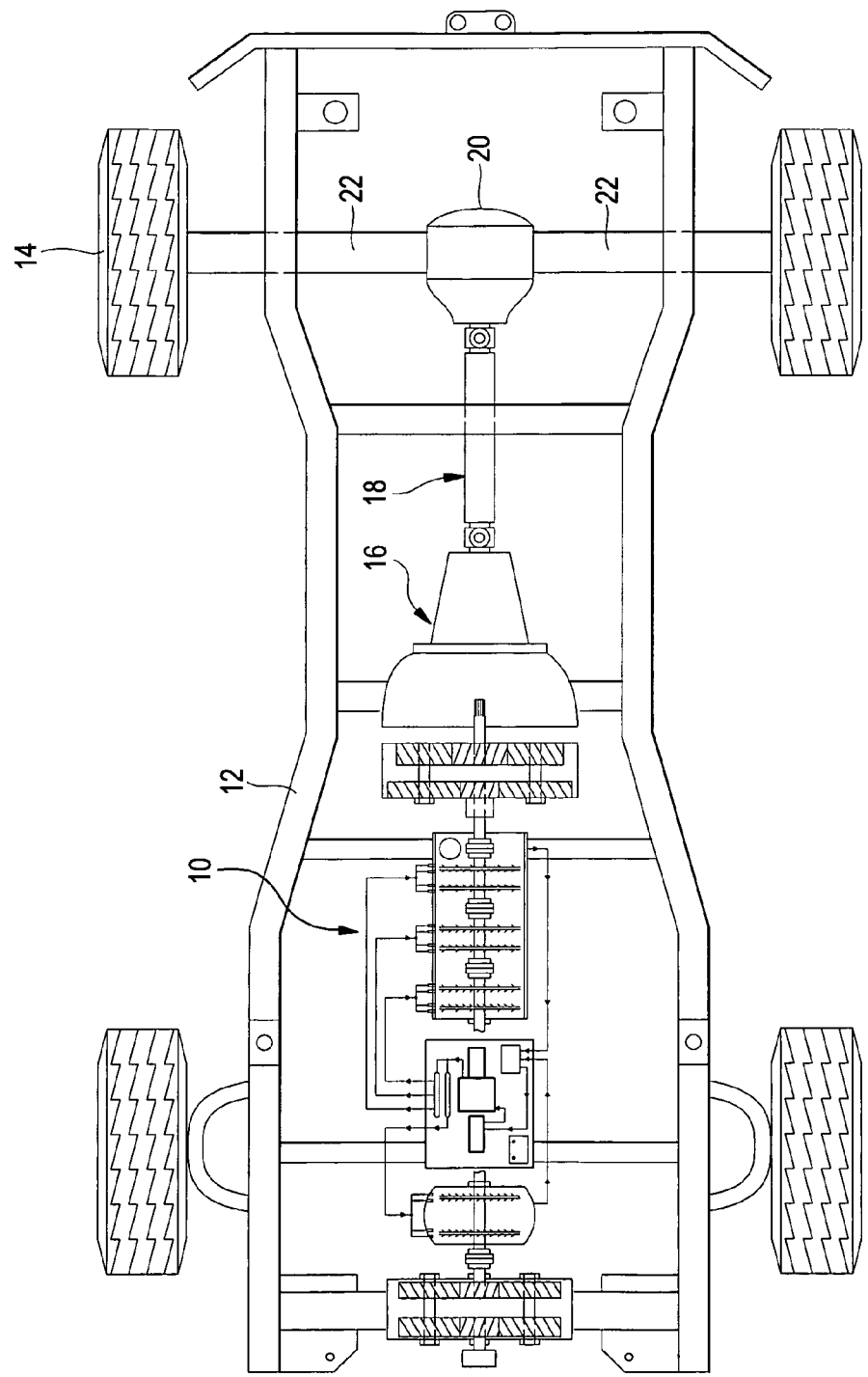
FIG. 1 is a plan view of the present invention shown in operative connection.

With regard to reference numerals used, the following numbering is used throughout the drawings.

10 present invention
12 frame of vehicle
14 wheels of vehicle
16 transmission
18 drive shaft
20 rear differential
22 drive axles
24 low pressure pump
26 high pressure pump
27 motor
28 main power housing
30 turbine
32 accessory power housing
34 turbine
36 spray nozzles
38 manifold
40 manifold
42 accessory torque multiplier
44 main torque multiplier
45 fluid supply tank
46 return line
48 return line
50 battery
52 pressure relief valve
54 blade
56 drive shaft
56' drive shaft
57 aperture
58 wall
60 fluid 62 junction box
64 stiffener plate
66 sloping bottom

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a liquid driven turbine engine is disclosed.

Figure 2:
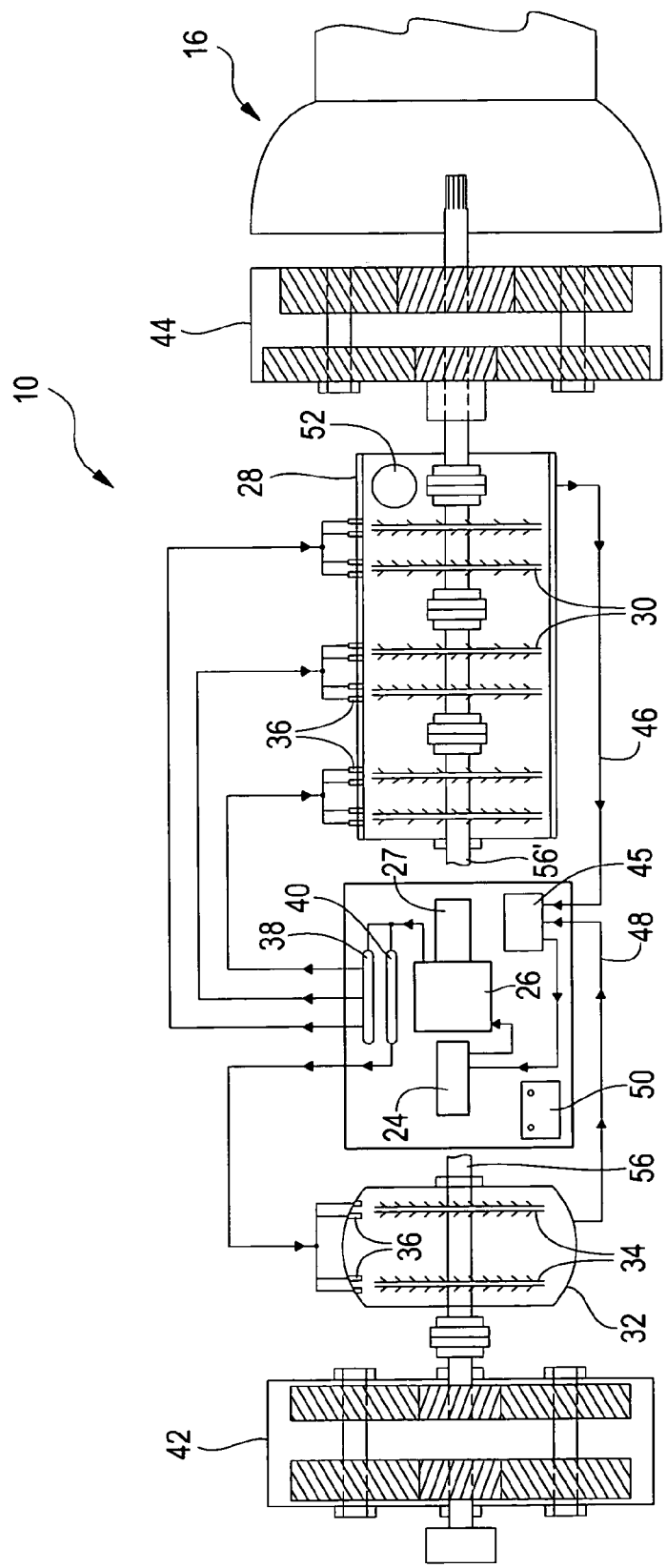
FIG. 2 is a plan view of portions of the present invention.

Turning to FIGS. 1 and 2, therein is shown the present invention 10 showing a vehicle frame 12 having a plurality of wheels with tires thereon 14 upon which the vehicle is operated. Also shown is a transmission 16 having a drive shaft 18 along with a rear differential 20 and left and right drive axles 22 which drive the rear wheels 14. As can be seen for illustration purposes, the components of the engine of the present invention 10 are generally disposed toward the front of a vehicle frame 12 and the drive train is generally disposed toward the rear; however, the engine and drive train of the present invention 10 could be placed in any portion of the vehicle as would be done in the standard manner by one skilled in the art. Furthermore, the engine of the present invention 10 is expected to be useful for marine applications, electrical generators, and other operations where engines are commonly used. Also shown is an expected effectively high pressure being approximately 50 psi lift or low pressure first stage pump 24 to supply extended life antifreeze fluid to the high pressure second stage pump 26 driven by motor 27. Lift pump 24 contains a motor/pump assembly. The high pressure pump 26 is expected to have an effectively high pressure range from about 3000 to about 5500 psi for acceleration of the vehicle and other related high power demand purposes driven by a 12-volt, three speed, high output motor 27. The main power head housing 28 contain twelve turbines 30 and the accessory power head housing 32 contains four turbines 34, each turned by spray from high pressure spray nozzles 36 supplied by two high pressure manifolds 38, 40 respectively. Nozzles 36 may be pivoted to adjust the speed and torque of the turbines and to be adaptable for use with different size turbines. There is an accessory torque multiplier 42 which is expected to operate at about a 10 to 1 ratio in order to power accessories having relatively low power requirements, e.g., the alternator, air conditioning compressor, power steering pump, power brake vacuum pump or the like. The main torque multiplier 44 is expected to operate at about a 10 or 14 to 1 ratio (depending on the horse power desired) which supplies an expected 250 to 550 ft-lb. torque to the transmission 16. Horse power is calculated at 93% of the torque. Each torque multiplier 42, 44 and all bearings are lubricated with 50 weight synthetic gear oil. A power output point or drive shaft or axle or power take-off point is shown at 56' for the main power housing 28 and 56 for the accessory power housing 32. All pumps, motors and manifolds, including a 40 psi oil pump for bearing lubrication are mounted beside the main power housing. Also shown is fluid supply tank 45 with return line 46 and 48 from the main power housing 28 and accessory power housing 32, respectively. Also shown is a power supply, e.g., battery 50. There is an oil cooler (not shown) in each of the torque multipliers 28, 32 also used to heat coolant for auto cab heater. There is a pressure relief valve or chamber 52 with a filtered vent to keep pressure low in the coolant tank 28 and exhaust excess pressure through a filtered muffler. Also shown is one or more, 1000 cold cranking ampere 12-volt batteries which supply power to the motors and pumps of the engine. Overall length of the engine is about 40 inches, with a width of about 30 inches and height of about 24 inches. Each turbine wheel 30, 34 has a diameter of about 12 inches with the blade angle of about ⅜ inch at the outside to about ¾ inch on the inside of the wheel at about a 60 degree arch with about 32 blades per side. Each turbine 30, 34 will consist of three parts, a left turn turbine, a right turn turbine and a center stiffener plate for an overall width of about 1⅞ inch. Turbines will be set about 10 degrees offset for continual pressure contact.

Figure 3:
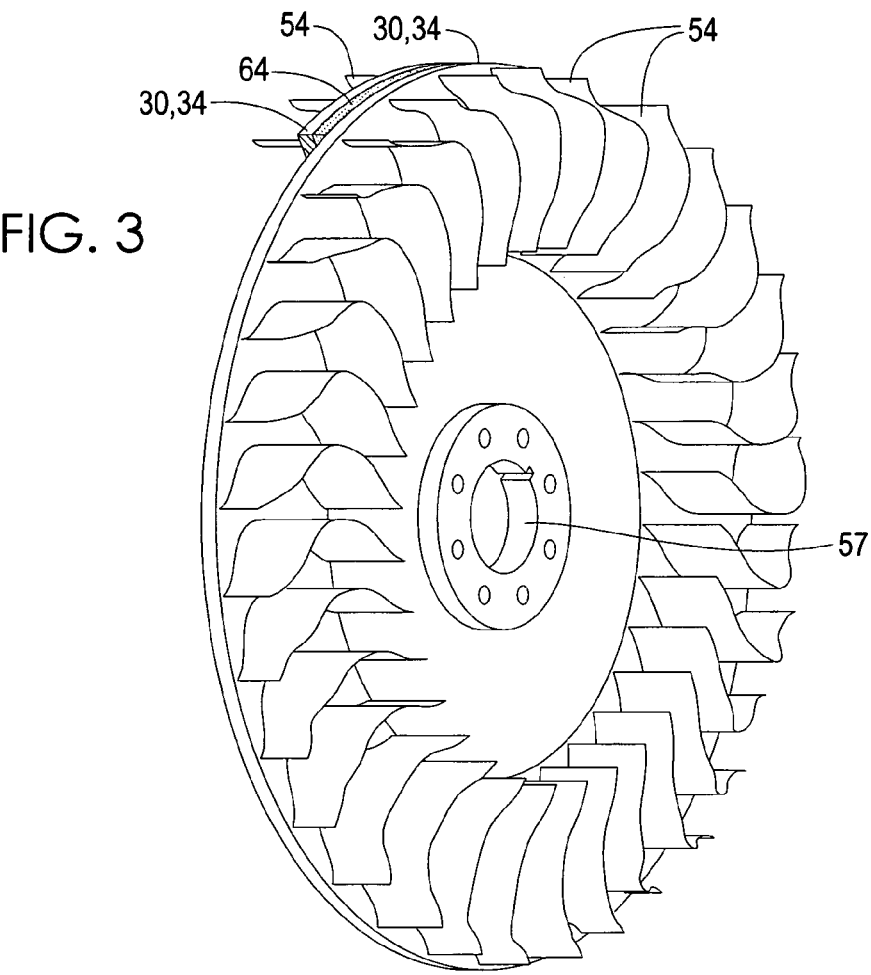
FIG. 3 is a perspective view of a turbine of the present invention.

Turning to FIG. 3, therein is shown an exemplary turbine blade 30, 34 having a plurality of blades 54 disposed thereon, along with a centrally disposed aperture 57 through which the drive shaft 56 extends. Each turbine 30, 34 will consist of three parts, a left turbine portion, a right turbine portion and a center stiffener plate for an overall width of about 1⅞ inch.

Figure 4:
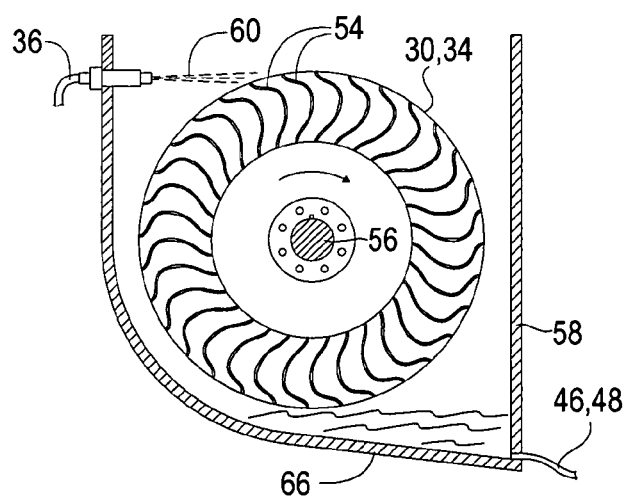
FIG. 4 is a cross sectional view of portions of the present invention.

Turning to FIG. 4, therein is shown the wall 58 of the main or accessory power housing 28, 32 showing a turbine 30, 34 mounted on central shaft 56 showing the inlet jets or spray nozzles 36 spraying the high pressure fluid 60 onto the blades 54 of the turbine so as to make the turbine rotate. Also shown is an accumulation of fluid 60 being disposed in the bottom of the case or housing 28, 34 having a sloping bottom 66 so that the return line 46, 48 can return the fluid to a central fluid supply tank/reservoir (not shown see FIGS. 1, 2).

Figure 5:
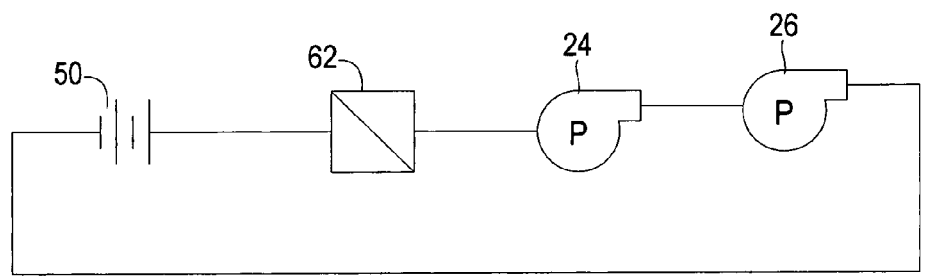
FIG. 5 is an electrical schematic for the present invention.

Turning to FIG. 5, therein is shown a power supply battery 50 providing energy to a central junction box 62 which then provides energy to a motor of power a pump 24, 26 in order to raise the pressure of the hydraulic fluid of the present invention to an acceptable level.

Figure 6:
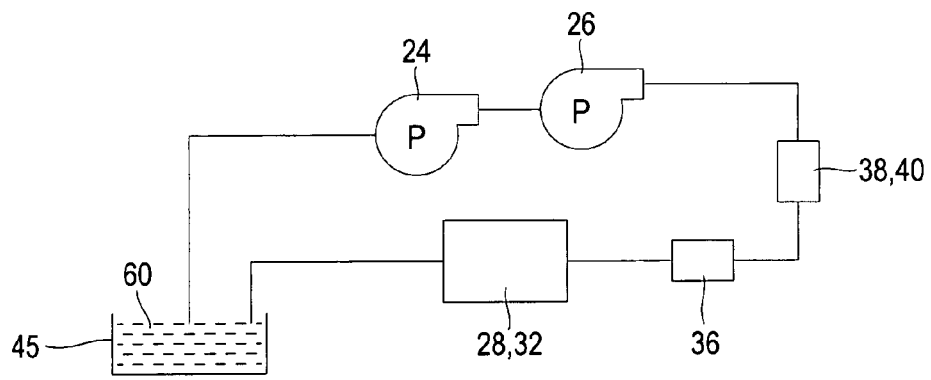
FIG. 6 is a fluid schematic of the present invention.

Turning to FIG. 6, therein is shown a central reservoir 45 containing the hydraulic fluid 60, which in this case is extended life antifreeze, showing the first stage pump 24 which raises the hydraulic pressure to about 50 psi and a second high pressure pump 26 which raises the hydraulic pressure to approximately 3000 to 5500 psi which pump the fluid through manifolds 38, 40, spray nozzles 36 and housing 28, 32.

I claim:
1. An apparatus for providing a hydraulic fluid driven engine, comprising:
  a) a reservoir for storing the fluid;
  b) a first stage pump comprising a motor/pump assembly for raising the pressure of the fluid to a first effectively high pressure;
  c) a second stage pump for raising the pressure of the fluid discharged from said first stage pump to a second effectively higher pressure and discharging the higher pressure fluid into separate first and second high pressure manifolds;
  d) a high output electric motor for driving said second stage pump;
  e) a main power housing, a plurality of first turbines being disposed in said main power housing, a first drive shaft being disposed in aid main power housing, wherein said first turbines are mounted on said first drive shaft;
  f) an accessory power housing, a plurality of second turbines being disposed in said accessory power housing, a second drive shaft being disposed in said accessory power housing, wherein said second turbines are mounted on said second drive shaft, said accessory power housing containing substantially fewer turbines than in said main power housing for providing auxiliary power to said engine;

g) a first plurality of spray nozzles for spraying fluid from said first high pressure manifold onto said first turbines and a second plurality of spray nozzles for spraying fluid from said second high pressure manifold onto said second turbines so as to make said first and second turbines rotate so as to rotate said first and second drive shafts, said first and second plurality of spray nozzles being pivotable to adjust speed and torque of said turbines and adaptable for use with different size turbines; and, h) a power supply comprising a battery for furnishing power to said first stage pump/motor assembly and said electric motor driving said second stage pump.

2. The apparatus of claim 1, wherein said fluid is antifreeze.

3. The apparatus of claim 1, wherein said first effectively high pressure is about 50 psi.

4. The apparatus of claim 3, wherein said second effectively higher pressure has a range of about 3000 psi to about 5500 psi.

5. The apparatus of claim 1, wherein said first and second turbines are arranged in pairs on their respective drive shafts, said first high pressure manifold having multiple take-offs of higher pressure fluid for delivery of said higher pressure fluid to separate pairs of second turbines in said main power housing.

6. The apparatus of claim 1, wherein said first drive shaft drives a vehicle.

7. The apparatus of claim 5, wherein each turbine consists of a left turn turbine, a right turn turbine, and a center stiffener plate.

8. A method for providing a hydraulic fluid driven engine, comprising the steps of:

a) providing a reservoir for storing the fluid;

b) providing a first stage pump comprising a motor/pump assembly for raising the pressure of the fluid to a first effectively high pressure;

c) providing a second stage pump for raising the pressure of the fluid discharged from said first stage pump to a second effectively higher pressure and discharging the higher pressure fluid into separate first and second high pressure manifolds;

d) a high output electric motor for driving said second stage pump;

e) providing a main power housing containing a plurality for first turbines mounted on a first drive shaft;

f) providing an accessory power housing containing a plurality of second turbines mounted on a second drive shaft, said accessory power housing containing substantially fewer first turbines than in said main power housing for providing auxiliary power to said engine;

g) providing a first plurality of spray nozzles for spraying fluid from said first high pressure manifold onto said first turbines and a second plurality of spray nozzles for spraying fluid from said second high pressure manifold onto said second turbines so as to make the first and second turbines and the first and second drive shafts rotate, said first and second plurality of spray nozzles being pivotable to adjust speed and torque of said turbines and adaptable for use with different size turbines; and, h) providing a power supply comprising a battery for furnishing power to the first stage pump/motor assembly and said electric motor driving said second stage pump.

9. The method of claim 8, wherein the fluid is antifreeze.

10. The method of claim 8, wherein the first effectively high pressure is about 50 psi.

11. The method of claim 10, wherein the second effectively higher pressure has a range of about 3000 psi to about 5500 psi.

12. The method of claim 8, wherein said first and second turbines are arranged in pairs on their respective drive shafts, said first high pressure manifold having multiple take-offs of higher pressure fluid for delivery of said higher pressure fluid to separate pairs of second turbines in said main power housing.

13. The method of claim 11, wherein each turbine consists of a left turn turbine, a right turn turbine, and a center stiffener plate.

14. The method of claim 13, wherein the second drive shaft drives lower power demand accessories on the vehicle.

* * * * *